US007536319B2

(12) United States Patent
Thakur et al.

(10) Patent No.: US 7,536,319 B2
(45) Date of Patent: May 19, 2009

(54) METHOD, SYSTEM, AND COMPUTER MEDIUM FOR DYNAMICALLY COUNTING DOWN TO AN ONLINE AUCTION END TIME

(75) Inventors: Sanjay Singh Thakur, Fremont, CA (US); Manish Srivastava, Cary, NC (US); German Bertot, Redwood City, CA (US); Saurabh Dewan, Noida (IN); Yunjie Ni, Redwood City, CA (US); Udaykumar Kottamasu, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 11/869,898

(22) Filed: Oct. 10, 2007

(65) Prior Publication Data

US 2009/0099939 A1 Apr. 16, 2009

(51) Int. Cl.
*G06Q 30/00* (2006.01)
*G06F 17/30* (2006.01)

(52) U.S. Cl. ................................ 705/26; 705/1; 705/27

(58) Field of Classification Search ..................... 705/1, 705/26–27, 37
See application file for complete search history.

(56) References Cited

U.S. PATENT DOCUMENTS

2002/0016743 A1* 2/2002 Dorr ........................... 705/26
2003/0028444 A1* 2/2003 Kubicek et al. ................ 705/26
2003/0191812 A1* 10/2003 Agarwalla et al. .......... 709/217
2007/0005483 A1* 1/2007 Graham ........................ 705/37
2007/0257816 A1* 11/2007 Lyle et al. .................... 340/905
2007/0271149 A1* 11/2007 Siegel et al. .................. 705/26

OTHER PUBLICATIONS http://timeleft.info/. "TimeLeft Info". Feb. 2, 2003 [recovered from [www.Archive.org on Feb. 17, 2009].*

"uBid.com and SmartShopper.com Launch First-Ever, Private-Label Comparison Shopping Tool; New uBidShopper provides relevant uBid.com offers, wide selection of alternative deals". PR Newswire. New York: May 22, 2006. [recovered from Proquest database on Feb. 17, 2009].*

* cited by examiner

*Primary Examiner*—Jeffrey A. Smith
*Assistant Examiner*—William J. Allen
(74) *Attorney, Agent, or Firm*—Townsend and Townsend and Crew LLP

(57) ABSTRACT

This disclosure describes, generally, methods and systems for dynamically counting down to an on-line auction end time. The method includes initiating a countdown clock with an end time that corresponds to the on-line auction end time, and accessing an auction server to obtain data used to refresh a current time of the countdown clock. The auction server is accessed at an incrementally faster refresh rate as the on-line auction end time is approached. The method further includes presenting, based on the refresh data obtained from accessing the auction server, an updated countdown clock.

17 Claims, 5 Drawing Sheets

METHOD, SYSTEM, AND COMPUTER MEDIUM FOR DYNAMICALLY COUNTING DOWN TO AN ONLINE AUCTION END TIME

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, countdown clocks, and more particularly, dynamically configurable countdown clocks for on-line auctions.

BACKGROUND

An important aspect of time-based auctions is knowing exactly when the auction is going to end. Specifically, with on-line auctions, whether a bidder wins the item or not can be decided in a matter of seconds. As such, presently a variety of countdown clocks exist to help notify a bidder of the closing time of an auction.

Nonetheless, such countdown clocks have a variety of shortcomings. For example, some countdown clocks run on the bidding site web browser, without any live synchronization mechanism with the auction server. Therefore, once a page is loaded and the countdown clock starts to run on a web browser, any changes to the auction end time are not reflected unless the browser page is refreshed. This could result inaccurate information presented to the bidder, such as the auction is about to end, when in fact that may not be the case. In addition, different bidders could see different auction end times, depending on when they last accessed the page.

Another drawback of current countdown clocks is that they are often one-dimensional, such that the clocks only count down based on the auction site's clock time and refresh at a set rate. These clocks do not allow auctioneers and/or bidders to customize options related to how the clock counts down and/or is refreshed. Accordingly, the present invention resolves these and other problems with current implementations.

BRIEF SUMMARY

Embodiments of the present invention are directed to dynamically configurable, countdown clocks. For example, as an on-line auction proceeds closer to its close time, an accurate clock time become increasingly more important. Accordingly, a dynamic countdown clock is able to refresh at a faster rate as the close of the auction approaches, thus providing a bidder with the most accurate countdown possible.

According to further embodiments, the countdown clock may also be able to dynamically update itself based on a change to the close time of an auction. For example, due to various unforeseen reasons, an auctioneer may decide to change an auction's close time, and it is important for a countdown clock to quickly and efficiently reflect such a change. Furthermore, a bidder often has information entered into text boxes and/or text fields within the on-line auction web page. Accordingly, in order for the bidder to not lose such input information, only the clock portion of the page should be refreshed while still maintaining the rest of the page.

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

An exemplary method of dynamically counting down to an on-line auction end time is described. The method includes initiating a countdown clock with an end time that corresponds to the on-line auction end time and accessing an auction server to obtain data used to refresh a current time of the countdown clock. The auction server is accessed at an incrementally faster refresh rate as the on-line auction end time is approached. The method further includes presenting, based on the refresh data obtained from accessing the auction server, an updated countdown clock.

In some embodiments, a method of dynamically updating an on-line auction counter end time is described. The method, for example, may include accessing an auction server to determine an initial end time for an on-line auction. The method further includes initiating a countdown clock associated with the on-line auction. The end time of the countdown clock corresponds to the initial end time of the on-line auction. The method then accesses, at a refresh interval, the auction server to determine whether the on-line auction end time has been changed and determines that the on-line auction end time has been changed from the initial end time to a subsequent end time. The method further updates the end time of the countdown clock by changing the end time from the initial end time to the subsequent end time.

In an alternative embodiment, a method of updating a countdown clock for an on-line auction, which is integrated into a webpage of the on-line auction, is described. The method includes providing an on-line auction webpage. The webpage may include at least a countdown clock associated with the auction and an input receiving portion. Furthermore, portions of the webpage are individually refreshable. The method further includes receiving input from a bidder into the input receiving portion of the webpage and refreshing the integrated countdown clock while leaving the input receiving portion unchanged. The method then presents the webpage with the refreshed integrated countdown clock and with the input in the input receiving portions.

In another alternative embodiment, a machine-readable medium for dynamically counting down to an on-line auction end time is described. The machine-readable medium, for example, may include initiating a countdown clock with an end time that corresponds to the on-line auction end time and accessing an auction server to obtain data used to refresh a current time of the countdown clock. The auction server is accessed at an incrementally faster refresh rate as the on-line auction end time is approached. The machine-readable medium further includes presenting, based on the refresh data obtained from accessing the auction server, an updated countdown clock.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

According to aspects of the present invention, a configurable on-line countdown clock is provided in part by dynamically changing the refresh rate of the countdown clock based on an end time of the auction. For example, as the end time of the auction approaches, the refresh rate of the countdown clock may be incrementally increased. As such, the refresh rate at the beginning of the auction may be once every 5 minutes, whereas near the end of the auction the refresh rate may be once every second. Therefore, the synchronization of the countdown clock with the server occurs more often near the end of the auction where synchronization is more critical (which is often a more important time of the auction), and near the beginning of the auction when synchronization with the server is less critical synchronization occurs less often (which is often a less important time of the auction). Furthermore, bandwidth and/or other system resources are not wasted by unnecessarily synchronizing with the server near the beginning of the auction.

According to further aspects of the present invention, the end time of the countdown clock may be updated based on a change in the end time of the auction. Often the end time of an auction may be unexpectedly changed (usually extended) and a bidder may not be aware of such a change. Thus, by updating the end time of the countdown clock to accurately reflect the end time of the auction allows a bidder to make more informed bids and be better positioned to win the item.

Figure 1:
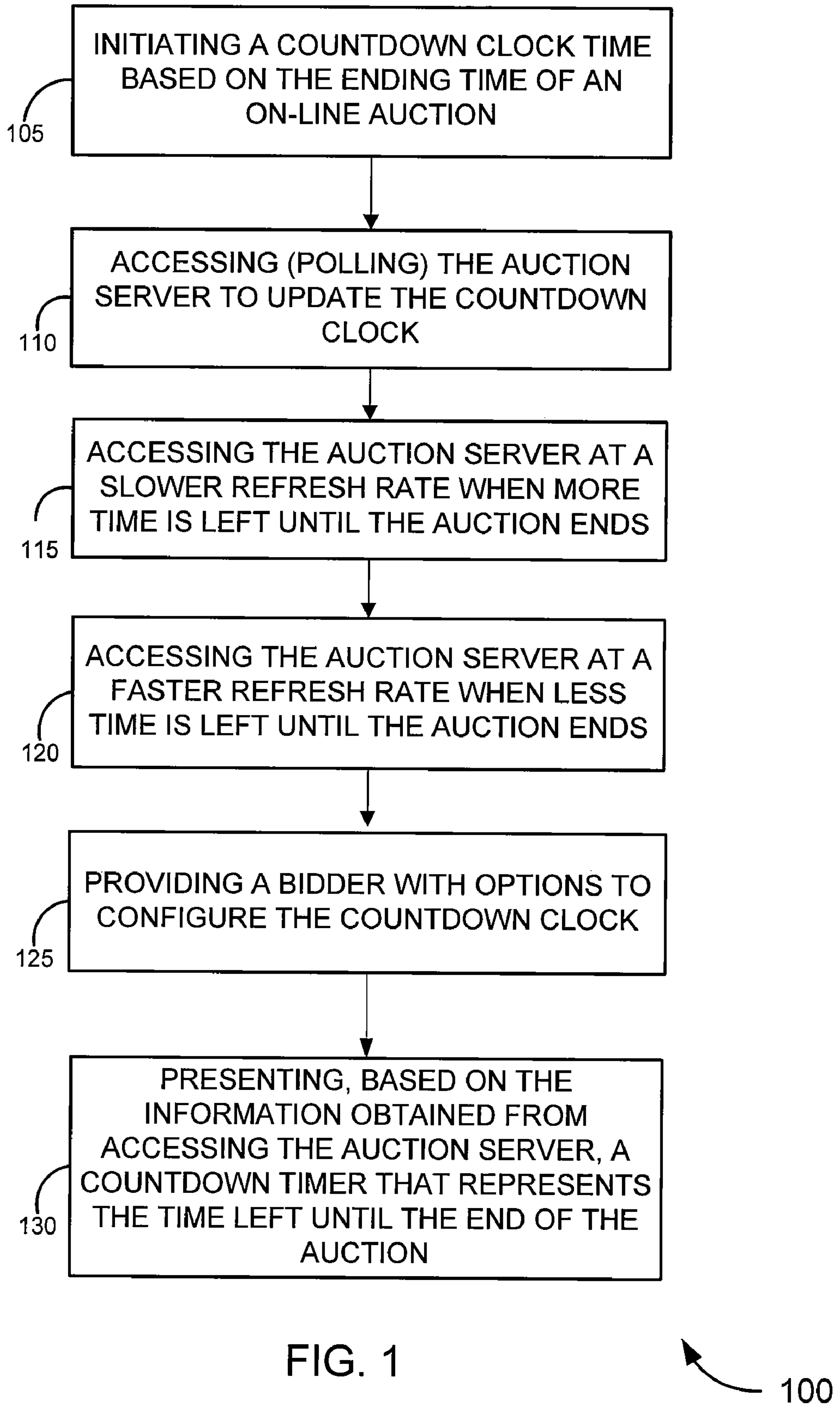
FIG. 1 is a process flow diagram illustrating a method of implementing a count down clock, in accordance with various embodiments of the invention.

Turning now to FIG. 1, which illustrates a method of dynamically counting down to the end of an on-line auction. At process block 105, a countdown clock may be initiated. The countdown clock may be initiated by setting the clock time to the end time of an auction. In one embodiment, the auction may be an on-line bidding auction (e.g., an EBay™ auction), where bidders can offer different maximum bids (or current bids) until the auction end time is reached. The end times of the auctions may be set at various amounts (e.g., 5 hours, 1 day, 1 week, etc.). Furthermore, the end times may be dynamic, based on the level of activity at the end of an auction. For example, if at the end of an auction (e.g., the last 5 minutes) a large number of bids (e.g., 20 bids) are placed, then the auctioneer may choose to have the auction extended for an additional period of time (e.g., 15 more minutes). In addition, the auctioneer may manually watch the bidding and, based on that information, extend the end time of the auction.

At process block 110, an auction server (e.g., server 515*a* in FIG. 5) may be accessed (or polled) to retrieve data pertaining to the end time of the auction. Thus, by accessing the auction server to retrieve updated end time data, the countdown clock maintains synchronization with the end time from the auction server. However, accessing the auction server can increase the bandwidth usage of the connection between the bidder and the auction server. Bandwidth can be quite valuable, thus wasting bandwidth is undesirable. Accordingly, only synchronizing (or refreshing) the countdown clock when needed may be a more efficient use of bandwidth.

In one embodiment, the accuracy of the countdown clock may be more important at various points within the auction run time. For example, when the auction has a greater amount of time remaining (e.g., 3 days), the accuracy of the countdown clock may be less important. Whereas, when the end of the auction is closer, the accuracy of the countdown clock may be more important. Thus, according to embodiments of the invention, as the end time of the auction approaches, the refresh rate of the countdown clock may be increased. For example, the refresh rate of the countdown clock may be inversely proportional to the time left until the end of the auction (i.e., more time left, slower refresh rate and less time left faster refresh rate).

Accordingly, at process block 115, the auction server may be accessed at a slower refresh rate when more time is left until the end of the auction, and at process block 120, the auction server may be accessed at a faster refresh rate when less time is left until the end of the auction. Furthermore, there may be threshold values that determine when the refresh rate is to be increased. For example, when the auction has 75% of the auction time left, the refresh rate may be every 5 minutes, whereas when only 50% of the auction time is left, the refresh rate may be every minute. Further, when only 25% of the auction time is left the refresh rate may be every 30 seconds, at 10% every 10 seconds, at 5% every 5 seconds, and so forth. The percentages and refresh rates are presented merely by way of example and one of ordinary skill in the art would appreciate that other values could be used.

In an alternate embodiment, the determination of the refresh rate could be based on a sliding scale. For example, in the beginning of the auction, the refresh rate starts out low (e.g., once every hour) and, as the time of the auction counts down, the refresh rate gradually increases. Thus, by the time the auction is about to end, the refresh rate may be, for example, once every millisecond. Thus, the countdown clock is more accurate near the end of the auction, while less bandwidth is used at the beginning of the auction.

At process block 125, the bidder may be provided with various options to configure the countdown clock. For example, the bidder may determine that a certain auction item is of particular importance and so the bidder may desire to increase the refresh rate of the countdown clock. Instead of using the sliding scale or threshold model, the bidder may want to input their own refresh criteria (e.g., refresh every hour until 10 minutes left in the auction, then refresh every second). Regardless of the refresh rate selected, the method of refreshing the updated countdown clock may be presented to the bidder based on the information obtained from accessing the auction server (process block 130). In one embodiment, the auction server may be accessed by JavaScript executing the countdown clock on the bidder's browser which sends an asynchronous HTTP request to a servlet running on the auction server. The servlet may then query the current auction information for a database connected to the auction server, and the servlet may then send a response back to the browser containing the current auction information.

Figure 2:
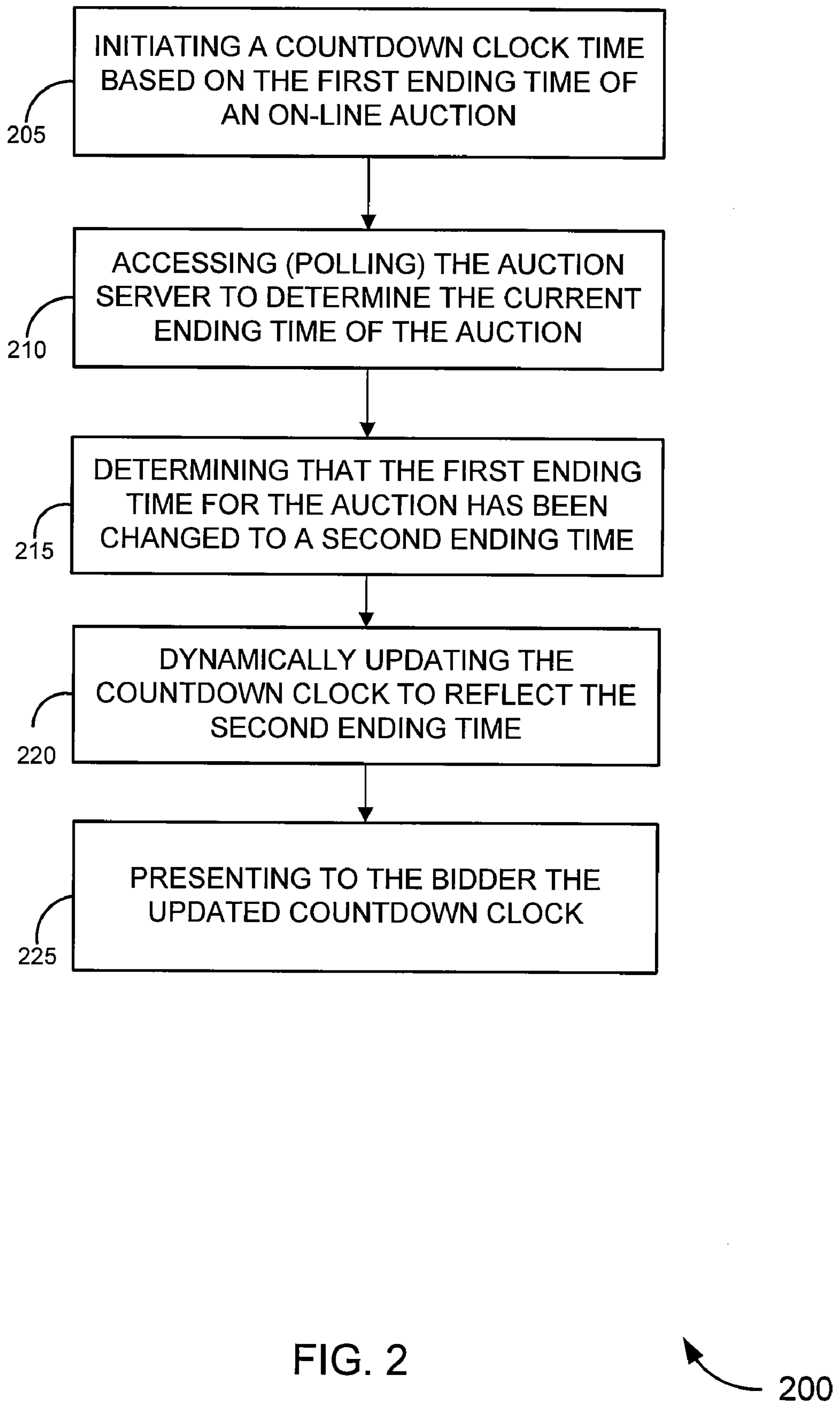
FIG. 2 is a process flow diagram illustrating dynamically updating an on-line auction counter end time, in accordance with various embodiments of the invention.

Turning now to FIG. 2, which illustrates a method of dynamically updating the end time of an on-line auction counter. At process block 205, a countdown clock associated with an auction may be initiated to an initial (or first) end time. The initial end time may be obtained by accessing an auction server. Occasionally the initiator (or auctioneer) of an auction may desire that the end time of the auction be changed. Often the auction time is extended in order to receive additional bids and drive up the price of the item. In order to determine whether the auction end time has changed, the auction server may be accessed to retrieve any updated end time information (process block 210).

At process block 215, it may be determined that the auction end time has been increased (e.g., 10 minutes have been added) and/or decreased. Thus, a new (or second) auction end time may then be determined. Accordingly, based on the new end time, the countdown clock may be dynamically in "real-time" updated to reflect the new end time (process block 220). Such that, without the bidder being aware of a change to the end time of the auction, the countdown clock will accurately reflect the updated end time. Nonetheless, an update message may be supplied to the bidder in conjunction with an update to inform the bidder of the change. In a further embodiment, the end time may be changed further, as such, the auction server may continue to be accessed in order to maintain synchronization between the countdown clock end time and the auction end time. The updated countdown clock may then be presented to the bidder (process block 225).

Figure 3:
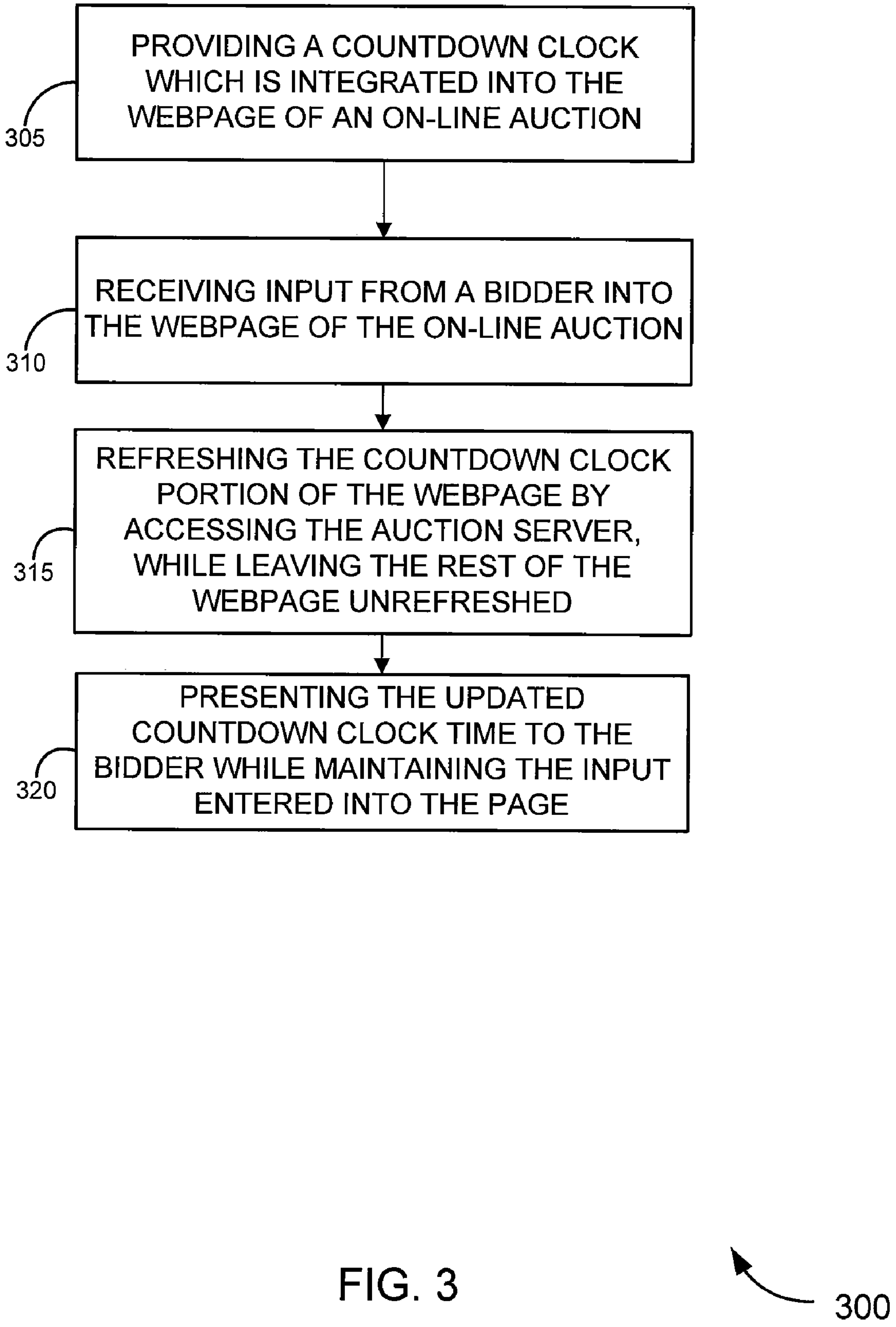
FIG. 3 is a process flow diagram illustrating updating a countdown clock for an on-line auction which is integrated into a webpage of the on-line auction, in accordance with various embodiments of the invention.

Turning now to FIG. 3, which illustrates a method of updating a countdown clock for an on-line auction, which is integrated into a webpage of the on-line auction. At process block 305, a countdown clock may be provided that is integrated into an on-line auction webpage. The webpage may be configured to accept input from the bidder. For example, the webpage may include editable areas (or input receiving portions), such as a text box, radio buttons, drop-down menus, etc. In one embodiment, the bidder may input information into the editable areas of the webpage (process block 310). Once the bidder has entered information into the editable areas it would be inconvenient for the bidder to reenter the information. Thus, in one embodiment, at process block 315, the countdown clock on the auction webpage is refreshed, while leaving the rest of the webpage unaltered (or un-refreshed). Accordingly, the input entered by the bidder may be preserved while the countdown clock is synchronized with the auction server.

In one embodiment, Asynchronous JavaScript and Extensible Markup Language (XML) (AJAX) programming technology may be used to selectively refresh only portions of a webpage; however, other technologies may be used. Furthermore, at process block 320, the updated webpage may be presented with the countdown clock synchronized and the input entered into the webpage maintained.

In a further embodiment, the bidder's rank in the auction (e.g., how many bidders are ahead of the bidder) may be dynamically updated and presented to the bidder without updating the rest of the webpage. For example, the auction server may be accessed to determine the bidder's rank and the rank displayed on the webpage may be updated while maintaining the rest of the webpage (i.e., input entered by the bidder). In addition, the "price-to-beat" may be similarly updated on the webpage. Furthermore, the rate at which the auction server is accessed to determine both the bidder's rank and the "price-to-beat" may be increased as the end of the auction approaches.

In an alternate embodiment, messages passed between the auctioneer and the bidder may be dynamically updated in "real-time." For example, the auctioneer may send a message to the bidder indicating that if the bidder would increase their bid by a certain amount, the auctioneer would be willing to sell the item to the bidder. This type of message may be critical to a bidder winning the item, thus the auction server may be accessed in order to retrieve such information. As discussed above, the messages may be updated without updating the rest of the webpage. Additionally, the server may be accessed more frequently as the end of the auction approaches, thus, providing more up-to-date messaging toward the end of the auction.

Figure 4:
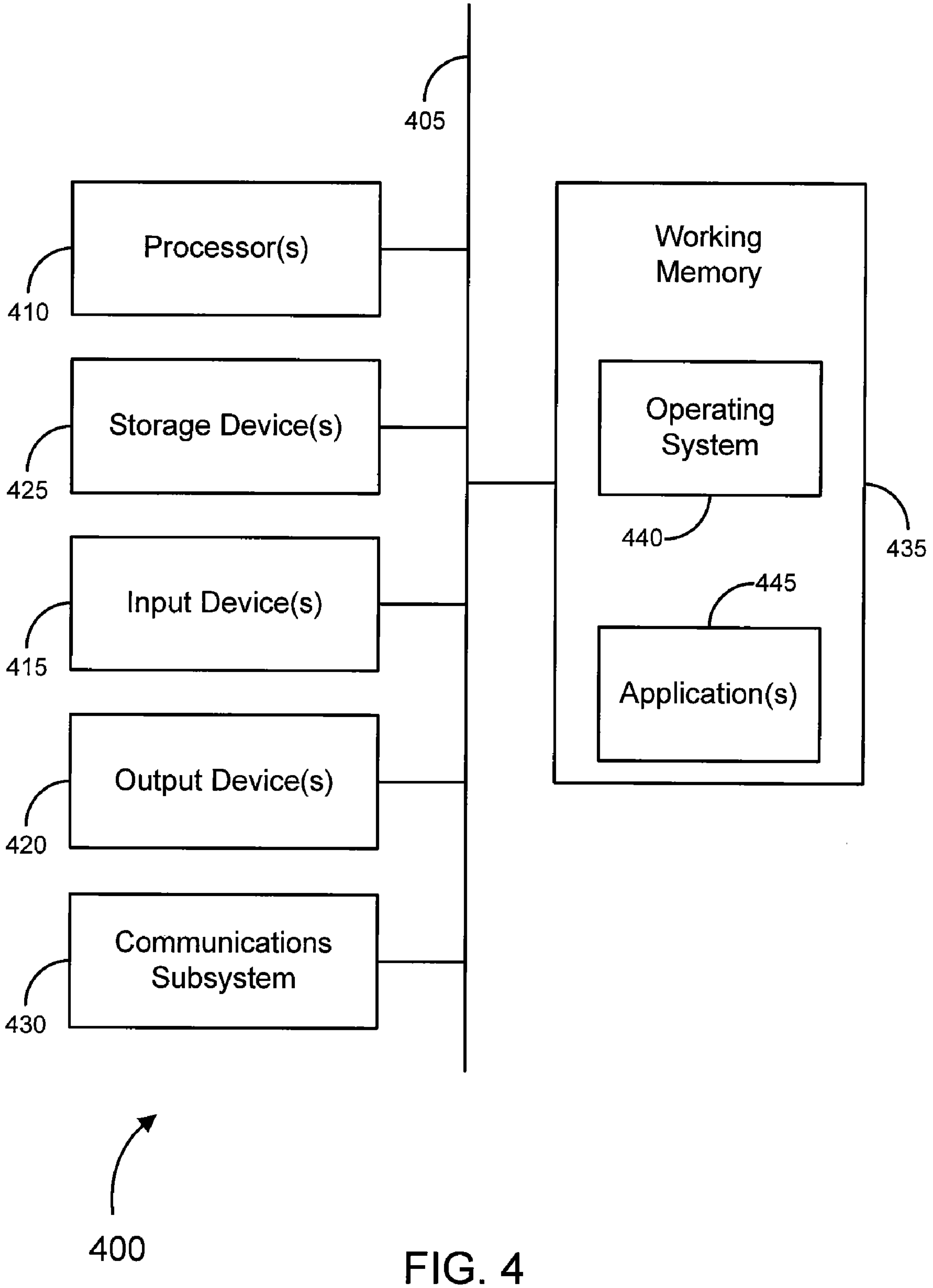
FIG. 4 is a generalized schematic diagram illustrating a computer system, in accordance with various embodiments of the invention.

FIG. 4 provides a schematic illustration of one embodiment of a computer system 400 that can perform the methods of the invention, as described herein, and/or can function as, for example, dynamically counting down to an on-line auction end time. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 430 may permit data to be exchanged with a network (such as the network described below, to name one example), and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440 and/or other code, such as one or more application programs 445, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 400) to perform methods of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another machine-readable medium, such as one or more of the storage device(s) 425. Merely by way of example, execution of the sequences of instructions contained in the working memory 435 might cause the processor(s) 410 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 400, various machine-readable media might be involved in providing instructions/code to processor (s) 410 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 425. Volatile media includes, without limitation dynamic memory, such as the working memory 435. Transmission media includes coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc., carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
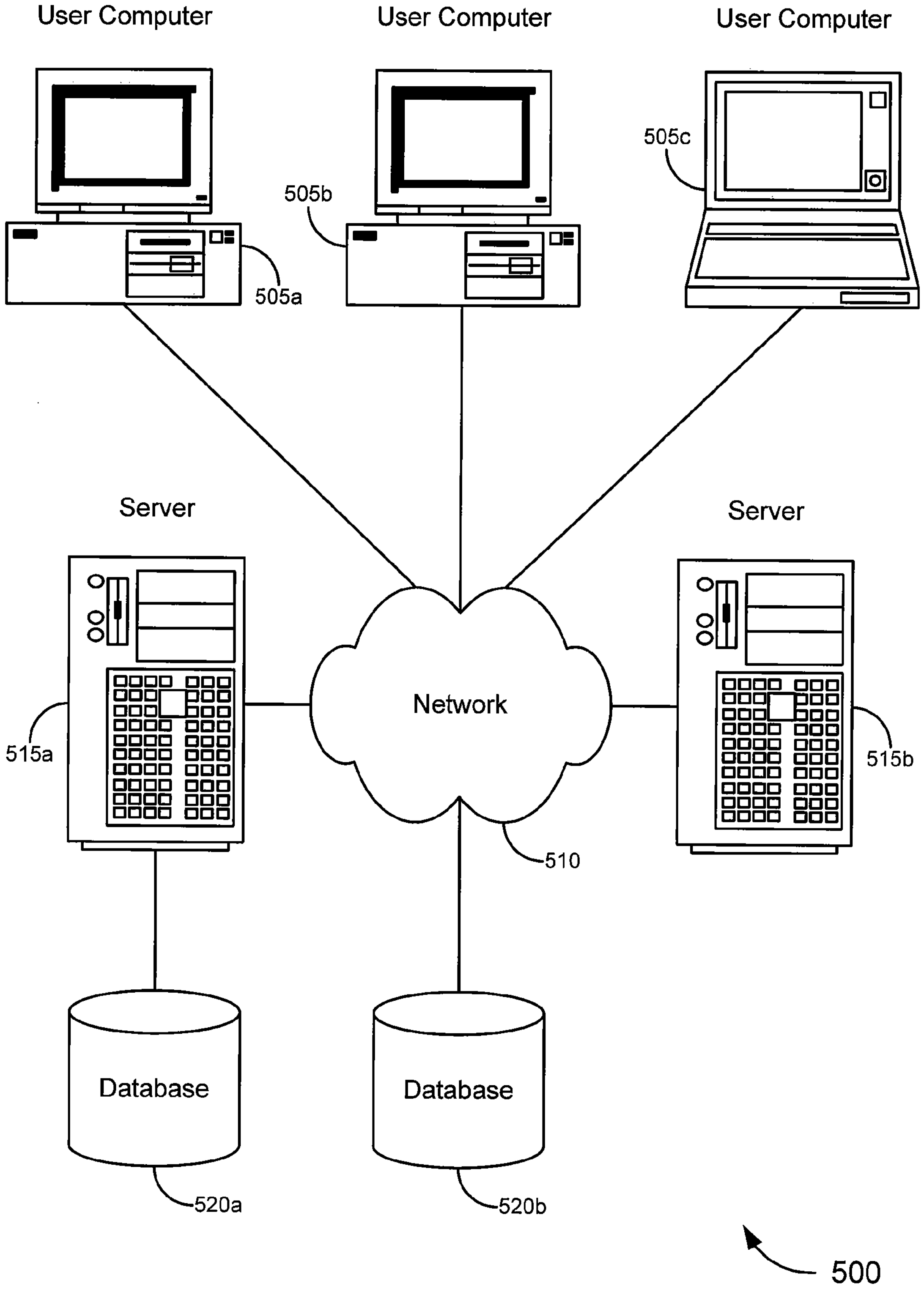
FIG. 5 is a block diagram illustrating a networked system of computers, which can be used in accordance with various embodiments of the invention.

A set of embodiments comprises systems for dynamically counting down to an on-line auction end time, updating an on-line auction counter end time, and/or updating a countdown clock for an on-line auction which is integrated into a webpage of the on-line auction. Merely by way of example, FIG. 5 illustrates a schematic diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 505 can also have any of a variety of applications, including one or more applications configured to perform methods of the invention, as well as one or more office applications, database client and/or server applications, and web browser applications. Alternatively, the user computers 505 can be any other electronic device, such as a thin-client computer, Internet-enabled mobile telephone, and/or personal digital assistant (PDA), capable of communicating via a network (e.g., the network 510 described below) and/or displaying and navigating web pages or other types of electronic documents. Although the exemplary system 500 is shown with three user computers 505, any number of user computers can be supported.

Certain embodiments of the invention operate in a networked environment, which can include a network 510. The network 510 can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 515. Each of the server computers 515 may be configured with an operating system, including without limitation any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 505 to perform methods of the invention.

The server computers 515, in some embodiments, might include one or more application servers, which can include one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 505 and/or another server 515. In some embodiments, an application server can create web pages dynamically for displaying the information in accordance with embodiments of the invention, such as a webpage of an on-line auction that has an integrated countdown clock. Data provided by an application server may be formatted as web pages (comprising HTML, Javascript, etc., for example) and/or may be forwarded to a user computer 505 via a web server (as described above, for example). Similarly, a web server might receive web page requests and/or input data from a user computer 505 and/or forward the web page requests and/or input data to an application server. In some cases a web server may be integrated with an application server.

In accordance with further embodiments, one or more servers 515 can function as a file server and/or can include one or more of the files (e.g., application code, data files, etc.) necessary to implement methods of the invention incorporated by an application running on a user computer 505 and/or another server 515. Alternatively, as those skilled in the art will appreciate, a file server can include all necessary files, allowing such an application to be invoked remotely by a user computer 505 and/or server 515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary: merely by way of example, a database **520*a* might reside on a storage medium local to (and/or resident in) a server 515*a* (and/or a user computer 505). Alternatively, a database 520*b* can be remote from any or all of the computers 505, 515, so long as it can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 520** can be a relational database, such as an Oracle™ database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of dynamically counting down to an on-line auction end time, the method comprising:

initiating a countdown clock with an end time that corresponds to the on-line auction end time;

accessing, by a servlet, an auction server to obtain data used to refresh a current time of the countdown clock, wherein the auction server is accessed at an incrementally faster refresh rate as the on-line auction end time is approached; and presenting, based on the refresh data obtained by the servlet from accessing the auction server, an updated countdown clock, wherein the refreshed countdown clock is automatically displayed.

2. The method of claim 1, further comprising:

accessing the auction server at a first rate with a first amount of time remaining until the on-line auction ends; and accessing the auction server at a second rate with a second amount of time remaining until the on-line auction ends;

wherein the first amount of time is greater than the second amount of time, and wherein the second rate is faster than the first rate.

3. The method of claim 2, wherein the first amount of time and the second amount of time are determined by threshold values which are proportionally related to the auction end time.

4. The method of claim 3, further comprising providing an auctioneer with one or more options configured to alter the threshold values associated with the refresh rate.

5. The method of claim 4, wherein the one or more options comprise at least one of increasing the threshold value, decreasing the threshold value, increasing the refresh rate, and decreasing the refresh rate.

6. The method of claim 1, further comprising:

accessing the auction server to determine whether the on-line auction end time has changed to an updated end time; and updating the end time of the countdown clock to correspond to the updated end time.

7. The method of claim 1, wherein the countdown clock is integrated into a webpage associated with the on-line auction.

8. The method of claim 7, wherein the on-line auction webpage is configured to allow certain portions of the webpage to be updated while other portions of the webpage remain unchanged.

9. The method of claim 8, wherein the webpage includes portions in which a bidder has entered information.

10. The method of claim 9, further comprising updating the integrated countdown clock without updating the portions in which the bidder has entered information.

11. The method of claim 1, further comprising:

accessing the auction server to determine a bidder's rank in the on-line auction; and presenting the bidder with an updated rank.

12. The method of claim 11, further comprising:

accessing the auction server to gather information to determine whether the bidder is a highest ranked bidder of the on-line auction; and presenting the bidder with the gathered information.

13. The method of claim 12, further comprising:

accessing the auction server in order to establish a price-to-beat for the bidder to be the highest ranked bidder; and presenting the bidder with the price-to-beat.

14. The method of claim 13, wherein a rate in which the auction server is accessed increases as the on-line auction end time is approached.

15. The method of claim 1, wherein the on-line auction is presented over the Internet.

16. A physical machine-readable medium for dynamically counting down to an on-line auction end time, the machine-readable medium having stored thereon sets of instructions which, when executed by a machine, cause the machine to:

initiate a countdown clock with an end time that corresponds to the on-line auction end time;

access, by a servlet, an auction server to obtain data used to refresh a current time of the countdown clock, wherein the auction server is accessed at an incrementally faster refresh rate as the on-line auction end time is approached; and present, based on the refresh data obtained by the servlet from accessing the auction server, an updated countdown clock, wherein the refreshed countdown clock is automatically displayed.

17. A system for dynamically counting down to an on\-line auction end time, the system comprising:

a memory device to store set of instructions; and at least one possessor coupled with the memory device to execute the set of instructions, wherein the sets of instructions cause the at least one processor to:

initiate a countdown clock with an end time that corresponds to the on-line auction end time;

access, by a servlet, an auction server to obtain data used to refresh a current time of the countdown clock, wherein the auction server is accessed at an incrementally faster refresh rate as the on-line auction end time is approached; and present, based on the refresh data obtained by the servlet from accessing the auction server, an updated countdown clock, wherein the refreshed countdown clock is automatically displayed.

* * * * *

UNITED STATES PATENT AND TRADEMARK OFFICE

CERTIFICATE OF CORRECTION

PATENT NO. : 7,536,319 B2
APPLICATION NO. : 11/869898
DATED : May 19, 2009
INVENTOR(S) : Thakur et al.

It is certified that error appears in the above-identified patent and that said Letters Patent is hereby corrected as shown below:

In column 12, line 44, in claim 17, delete "on\-line" and insert -- on-line --, therefor.

Signed and Sealed this

Eighth Day of June, 2010

David J. Kappos
*Director of the United States Patent and Trademark Office*